United States Patent

Mochizuki et al.

[11] Patent Number: 5,131,228
[45] Date of Patent: Jul. 21, 1992

[54] CONTROL APPARATUS FOR A TURBOCHARGED ALCOHOL ENGINE

[75] Inventors: Kenji Mochizuki; Takamitsu Kashima, both of Tokyo, Japan

[73] Assignee: Fuji Jukogyo Kabushiki Kaisha, Tokyo, Japan

[21] Appl. No.: 559,265

[22] Filed: Jul. 27, 1990

[30] Foreign Application Priority Data

Aug. 8, 1989 [JP] Japan .................. 63-206234
Aug. 8, 1989 [JP] Japan .................. 63-206235

[51] Int. Cl.⁵ .......................... F02B 37/00
[52] U.S. Cl. .......................... 60/602; 123/575
[58] Field of Search ............... 60/600-603, 60/611; 123/564, 416, 575

[56] References Cited

U.S. PATENT DOCUMENTS

4,424,676 1/1984 Meiners .................. 60/605.1
4,539,948 9/1985 Toepel .................... 123/564 X
4,703,732 11/1987 Wineland et al. ........... 123/416

Primary Examiner—Michael Koczo
Attorney, Agent, or Firm—Beveridge, DeGrandi & Weilacher

[57] ABSTRACT

A control apparatus for an alcohol engine of a vehicle, the engine having an auxiliary equipment and using a fuel containing alcohol, comprising: an alcohol concentration sensor for outputting a detection signal corresponding to an alcohol concentration of the fuel; alcohol concentration calculating means responsive to said detection signal for calculating said alcohol concentration; determining means responsive to said alcohol concentration for computing an optimum condition to operate the auxiliary equipment; and driving means responsive to said optimum condition for driving the auxiliary equipment.

5 Claims, 6 Drawing Sheets

CONTROL APPARATUS FOR A TURBOCHARGED ALCOHOL ENGINE

BACKGROUND OF THE INVENTION

The present invention relates to an alcohol engine for a Flexible Fuel Vehicle (FFV) capable of using a gasoline fuel, an alcohol fuel or a mixed fuel of gasoline and alcohol, and more particularly to an apparatus for controlling the operation conditions of auxiliary equipments mounted on the engine, such as a turbocharger, supercharger and fuel pumps in response to the concentration of the alcohol.

With an alcohol engine of this type, the alcohol concentration in a fuel varies from 0% to 100% depending upon the type of the supplied fuel. It is therefore necessary to control the engine in consideration of the alcohol concentration.

Japanese Patent Laid-open Publications Nos. 56-66424 and 61-218741 disclose that the ignition timing and fuel injection amount are controlled in accordance with a detected alcohol concentration.

Generally, a supercharger or turbocharger is used for increasing air supply amount to the engine so that the output is increased correspondingly. However, under constant supercharging, the potential of the engine cannot be used sufficiently, depending upon the alcohol concentration.

In the meantime, the fuel supply amount is required to be changed largely, e.g., about several times, if the alcohol concentration changes largely. In a conventional fuel supply system, an oil pump with a large capacity is necessary for supplying sufficient fuel. However, if the fuel injection amount becomes small at a low alcohol concentration, returned fuel is increased. Therefore, energy generated by the engine is wasted and so much noises generate.

SUMMARY OF THE INVENTION

It is an object of the present invention to provide an apparatus for certainly controlling the operation conditions of auxiliary equipments mounted on an alcohol engine in response to the alcohol concentration of a fuel, so as to increase outputs of the engine.

It is other object of the present invention to provide an apparatus for controlling supercharging pressure of a supercharger or turbocharger in accordance with the change in the alcohol concentration of a fuel so as to sufficiently use the potential of an engine.

It is another object of the present invention to provide a control apparatus for controlling the fuel supply amount of oil pumps in accordance with the change in the alcohol concentration of a fuel so as to supply an optimum amount of fuel.

In order to achieve the above objects, the present invention provides: a control apparatus for an alcohol engine of a vehicle, the engine having an auxiliary equipment and using a fuel containing alcohol, comprising: an alcohol concentration sensor for outputting a detection signal corresponding to an alcohol concentration of the fuel; alcohol concentration calculating means responsive to said detection signal for calculating said alcohol concentration; determining means responsive to said alcohol concentration for computing an optimum condition to operate the auxiliary equipment; and driving means responsive to said optimum condition for driving the auxiliary equipment.

DESCRIPTION OF THE PREFERRED EMBODIMENTS

FIGS. 1 to 5 show a first embodiment of the present invention, in which a turbocharger as an auxiliary equipment is controlled dependent on an alcohol concentration of a fuel.

Figure 2:
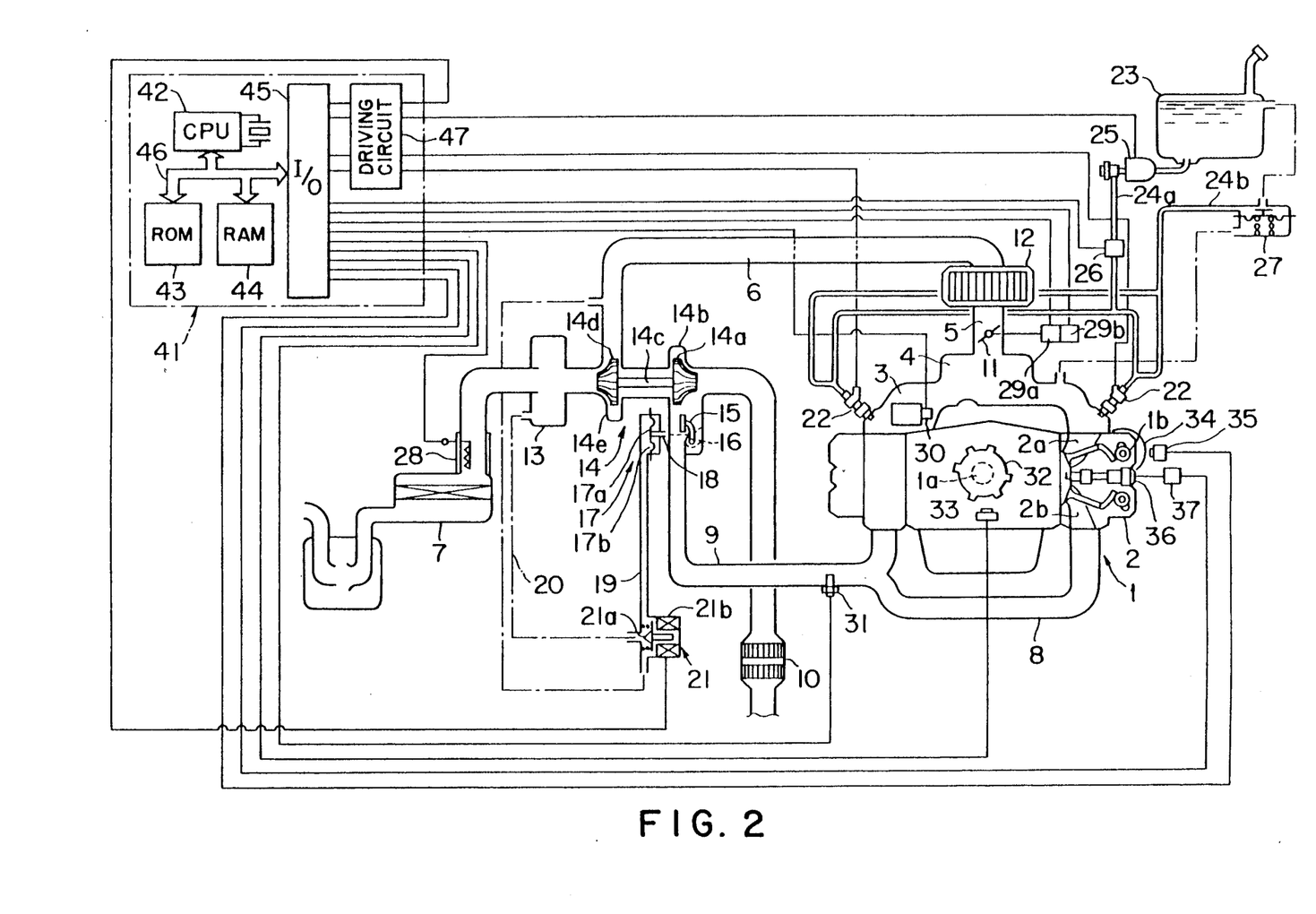
FIG. 2 is a schematic diagram of an engine control system.

Referring to FIG. 2, reference numeral 1 generally represents an FFV alcohol engine of a horizontally opposed type. At a cylinder head 2 of the engine 1, there are formed an air intake port 2a and an exhaust port 2b.

The air intake port 2a communicates with an intake manifold 3. At an upstream of the intake manifold 3, a throttle chamber 5 is formed in communication with the intake manifold 3 via an air chamber 4. At the upstream of the throttle chamber 5, there is mounted an air cleaner 7 via an air intake pipe 6.

An exhaust pipe 9 communicates with the exhaust port 2b via an exhaust manifold 8. A catalyst converter 10 is coupled to the exhaust pipe 9.

A throttle valve 11 is mounted within the throttle chamber 5. At the upstream end of the throttle chamber, an inter-cooler 12 is coupled, and a resonator chamber 13 is coupled at the downstream end of the air cleaner 7.

Reference numeral 14 represents a turbocharger as an example of a supercharger. A turbine wheel 14a of the turbocharger 14 is housed within a turbine housing 14b which communicates with the exhaust pipe 9. A compressor wheel 14d coupled via a turbine shaft 14 to the turbine wheel 14a is housed within a compressor housing 14e formed at the downstream of the resonator chamber 13 at the air intake pipe 6.

At an inlet of the turbine housing 14b, there is mounted a waste gate valve 15. A lever 16 cooperatively coupled to the waste gate valve 15 is coupled via a rod 18 to a diaphragm 17a of a diaphragm actuator 17. A pressure chamber 17b of the diaphragm actuator 17 communicates with an outlet port of the compressor housing 14e at the air intake pipe 6 via a pressure passage 19.

Midway along the pressure passage 19, the resonator chamber 13 is coupled via a pressure reducing passage 20. A valve 21a of a duty solenoid valve 21 as an example of a supercharging pressure control actuator is mounted between the pressure passage 19 and the pressure reducing passage 20.

The duty solenoid valve 21 is controlled by a duty signal supplied to a solenoid coil 21b from a control unit 41 to be described later. The pressure in the pressure chamber 17b for the diaphragm actuator 17 is controlled to maintain a certain value at the balance point between the pressure in the pressure chamber 17b and the force exerted by a diaphragm spring (not shown) which causes the diaphragm 17a of the diaphragm actuator 17 to always retract and the waste gate valve 15 to close by means of the rod 18 and lever 16, thereby controlling an aperture area at the inlet of the turbine housing 14b and hence controlling the supercharging pressure.

In this embodiment, the smaller a duty ratio of the duty signal, the longer the time while the pressure passage 20 is opened by the valve 21a of the solenoid valve 21. Accordingly, leakage amount of a positive pressure at the downstream end of the compressor wheel 14d supplied to the pressure chamber 17b of the diaphragm actuator 17 is increased so that the aperture area at the inlet of the turbine housing 14b is made small by the waste gate valve 15 and the supercharging pressure rises.

Injectors 22 are mounted upstream near the air intake port 2a of the intake manifold 3. The injectors 22 and a fuel tank 23 are communicated with each other by a fuel passage 24a and fuel return passage 24b. At the fuel passage 24a, there are mounted a fuel pump 25, and an alcohol concentration sensor 26 in this order as viewed from the fuel tank 23.

The fuel tank 23 stores therein a fuel of which alcohol concentration changes from 0% to 100% such as a fuel containing only alcohol, a fuel containing only gasoline, or a fuel containing both alcohol and gasoline, depending upon the circumstances when the user supplies the fuel into the fuel tank 23.

The alcohol concentration sensor 26 is constructed of, e.g., a pair of electrodes mounted within the fuel passage 24a, which electrodes detect an alcohol concentration A from a current change caused by an electric conductivity change with the alcohol concentration of a fuel.

A pressure regulator 27 is mounted on the fuel return passage 24b to maintain always constant the difference between the pressure of the intake manifold 3 and the fuel pressure, thereby controlling the fuel injection amount from the injector 22 not to change with a variation of the pressure of the intake manifold 3.

An intake air flow sensor (in FIG. 2 a hot wire type air flow meter) 28 is mounted downstream near the air cleaner 7 at the air intake pipe 6. At the throttle valve 11, there are mounted a throttle opening degree sensor 29a and an idling switch 29b for detecting the full closing of the throttle valve 11. A coolant temperature sensor 30 is mounted at a coolant path (not shown) as a riser formed at the intake manifold 3, and an $O_2$ sensor at the exhaust pipe 9.

A crank angle sensor 33 is mounted opposing a crank rotor 32 coupled to the crank shaft 1a of the engine 1. A cam angle sensor 35 is mounted opposing a cam rotor 34 coupled to the cam shaft 1b of the engine 1.

Circuit Arrangement of Control Apparatus

Reference numeral 41 generally represents the control unit. In this control unit 41, interconnected together via a bus line 46 are a CPU (Central Processing Unit) 42, a ROM 43, a RAM 44 and an I/O interface 45. The above-described sensors 26, 28, 29a, 30, 31, 33, 35 and idling switch 29b are connected to input ports of the I/O interface, and to output ports there are connected an ignition plug 36 via an igniter 37, the injector 22, the fuel pump 25 and the solenoid coil 21b of the duty solenoid valve 21, respectively via a driver circuit 47.

The ROM 43 stores control programs, and fixed data which is an optimum supercharging pressure map MPPCHA to be described later.

The RAM 44 stores processed output signals from the sensors, and data processed by the CPU 42.

In accordance with the control programs stored in the ROM 43 and various data stored in the RAM 44, the CPU 42 calculates the pulse width of a pulse for driving the injector 22, the ignition timing for driving the igniter 37, and the duty ratio of a pulse for driving the duty solenoid valve 21.

Supercharging Pressure Control Function and Structure of Control Apparatus

Figure 1:
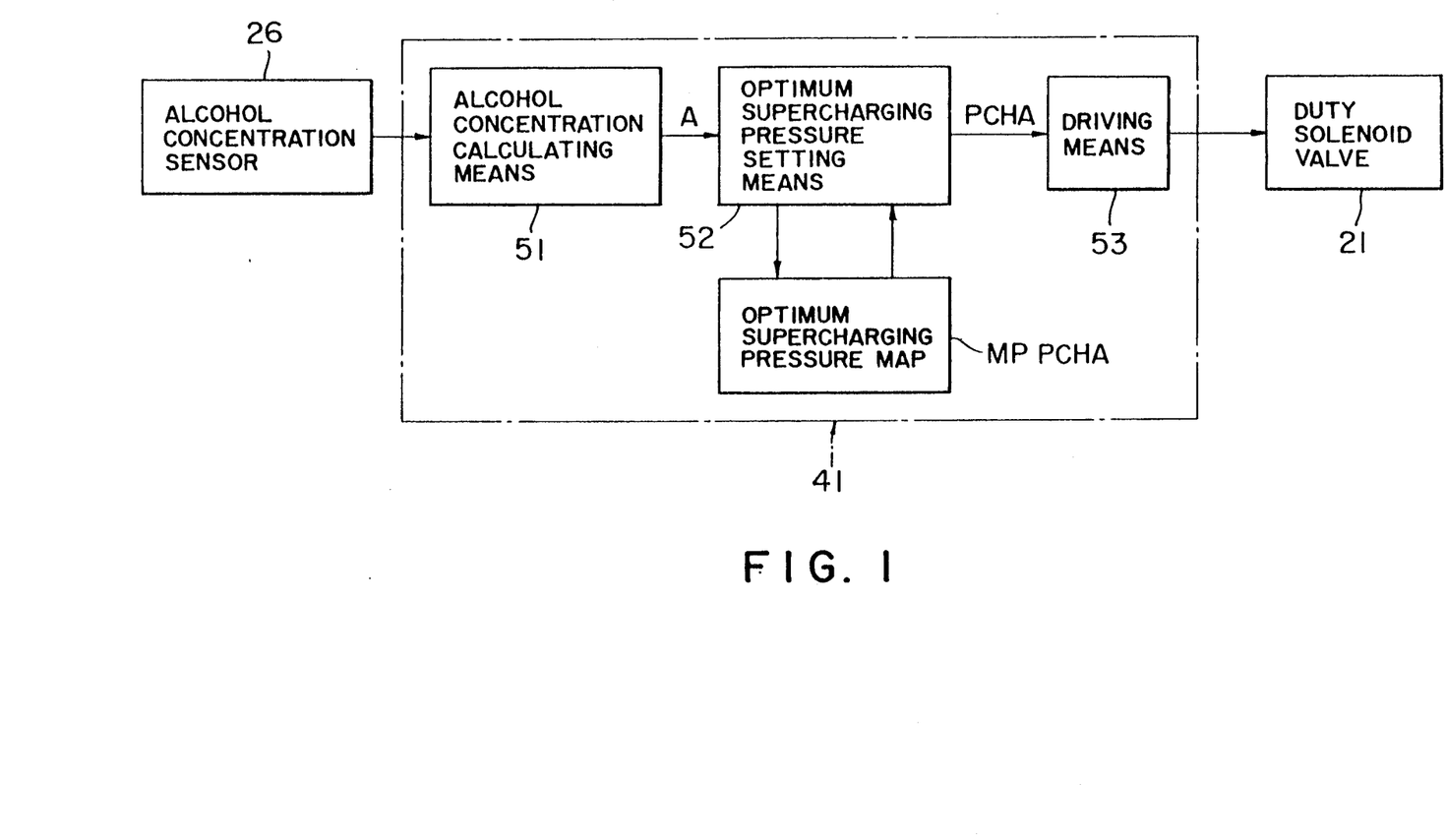
FIG. 1 is a functional block diagram of a supercharging pressure control of the present invention.

As shown in FIG. 1, the supercharging pressure control function of the control unit 41 comprises alcohol concentration calculating means 51, optimum supercharging pressure setting means 52, and driving means 53.

The alcohol concentration calculating means 51 reads a signal outputted from the alcohol concentration sensor 26 to calculate the alcohol concentration A of a fuel supplied to the injector 22 in accordance with, e.g., a current value corresponding to the electric conductivity of the fuel.

The optimum supercharging pressure setting means 52 searches the optimum supercharging pressure map MPPCHA using as a parameter the alcohol concentration A calculated by the alcohol concentration calculating means 51, and sets an optimum supercharging pressure directly or by means of an interpolation calculation.

Since an octane number of alcohol (methanol, ethanol, and so on) is larger than that of gasoline, a total octane number of a mixed fuel of gasoline and alcohol becomes larger, as the alcohol concentration A becomes higher.

Accordingly, the higher the alcohol concentration A of a fuel, the supercharging pressure can be made higher without knocking. Thus, the higher the alcohol concentration A, the higher the optimum supercharging pressure.

Figure 3:
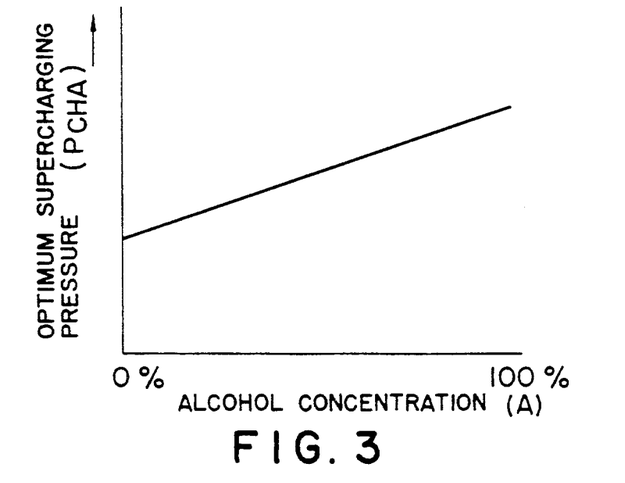
FIG. 3 is a graph showing an optimum supercharging pressure with respect to alcohol concentration.
Figure 4:
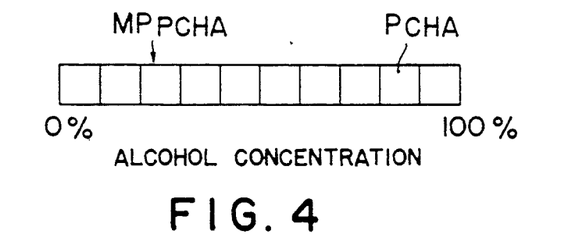
FIG. 4 is an optimum supercharging pressure map storing a duty ratio representing the optimum supercharging pressure with respect to the alcohol concentration.

The optimum supercharging pressure PCHA relative to the alcohol concentration A within a knocking limit obtained by experiment is shown in FIG. 3. Optimum supercharging pressures relative to the alcohol concentration A obtained through experiments or the like are stored in the optimum supercharging pressure map MPPCHA at various areas thereof as shown in FIG. 4.

The optimum supercharging pressure map MPPCHA stores the supercharging pressure data which take higher values for higher alcohol concentration A. The optimum supercharging pressure PCHA in the optimum supercharging pressure map MPPCHA is stored as a duty ratio of a duty signal for driving the duty solenoid valve 21. That is, a lower duty ratio is stored for a higher alcohol concentration A.

The driving means 53 outputs the duty signal corresponding to the optimum supercharging pressure (duty ratio) PCHA set by the optimum supercharging pressure setting means 52 to the solenoid coil 21b of the duty solenoid valve 21.

Supercharging Pressure Control Procedure

The supercharging pressure control procedure by the control unit 41 will be described next with reference to a flow chart shown in FIG. 5.

Figure 5:
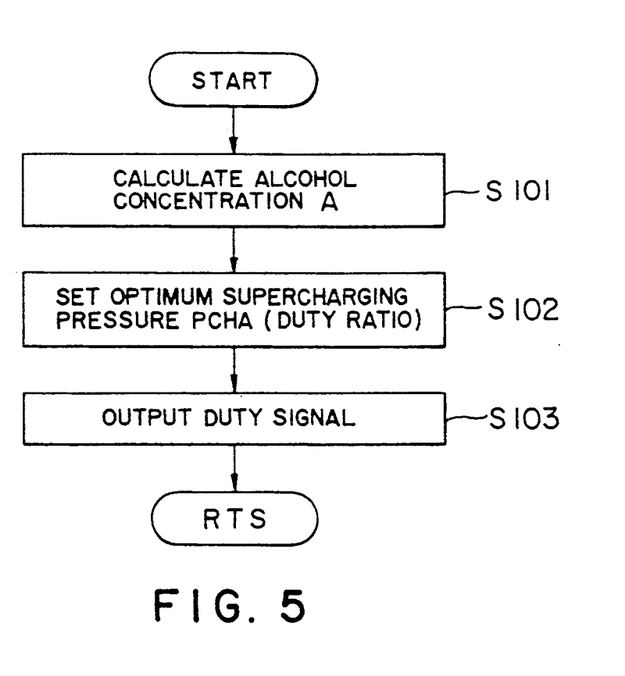
FIG. 5 is a flow chart showing a supercharging pressure control procedure.

The program as illustrated in FIG. 5 is an interrupt program which is executed at a predetermined time or at a predetermined cycle during the period from when the power of the control apparatus 41 is turned on to when it is turned off (from the engine start to the engine stop).

First at a step S101, a signal from the alcohol concentration sensor 26 is read to calculate the alcohol concentration A of the fuel. At a step S102, using as the parameter the alcohol concentration A calculated at the step S101, the alcohol concentration calculating means 52 searches the optimum supercharging pressure map MPPCHA to set the optimum supercharging pressure PCHA directly or through the interpolation calculation.

At a step S103, the driving means 53 outputs the duty signal corresponding to the optimum supercharging pressure PCHA set at the step S102 to the solenoid coil 21b of the duty solenoid valve 21. The duty signal is held until the next supercharging pressure control program is executed.

When the engine starts, the turbine wheel 14a of the turbocharger 14 rotates because of the exhaust gas pressure (exhaust pressure) in the exhaust pipe 9. Therefore, the compressor wheel 14d coupled via the turbine shaft 14c to the turbine wheel 14a also rotates to supercharge the intake air.

The exhaust pressure is low during low engine load and low engine speed so that the supercharging pressure at the compressor wheel 14d is also low. As the engine speed and load increase, the supercharging pressure gradually rises.

At this time, by the supercharging pressure control procedure of the control apparatus 41, the higher the alcohol concentration A of the fuel, the lower duty ratio of the duty signal for the higher supercharging data is outputted to the solenoid coil 21b of the duty solenoid valve 21. Accordingly, it lengthens the time while the pressure reducing path 20 is opened by the valve 21a of the duty solenoid valve 21, and increases the leakage amount of the supercharging pressure at the downstream of the compressor wheel 14d of the turbocharger 14. The leaked supercharging pressure acts upon the pressure chamber 17b of the diaphragm actuator 17 via the pressure passage 19. The supercharging pressure applied to the pressure chamber 17b of the diaphragm actuator 17 lowers correspondingly so that the diaphragm 17a of the diaphragm actuator 17 is retracted by the spring force of the diaphragm spring (not shown).

As a result, the rod 18 coupled to the diaphragm 17a is retracted so that the waste gate valve 15 is rotated in the counter-clockwise direction in FIG. 2 by the lever 16 coupled to the rod 18, thereby making small an inlet area of the turbine housing 14b. The exhaust gas flow rate at the inlet increases correspondingly so that the turbine wheel 14a rotates faster to thus raise the supercharging pressure.

As the alcohol concentration A of the fuel becomes higher, the duty signal of a higher duty ratio is supplied from the control unit 41 to the solenoid coil 21b of the duty solenoid valve 21. Therefore, it lengthens the time while the pressure reducing passage 20 communicating with the resonator chamber 13 is closed by the valve 21a of the duty solenoid valve 21, and reduces the leakage amount of the supercharging pressure supplied to the pressure chamber 17b of the diaphragm actuator 17. As a result, the diaphragm 17a of the diaphragm actuator 17 projects forward against the spring force of the diaphragm spring (not shown) to cause the waste gate valve 15 to rotate in the clockwise direction in FIG. 2 and to gradually enlarge the aperture area of the inlet of the turbine housing 14b. A small amount of the exhaust gas flow passing through the flow inlet bypasses the turbine wheel 14a so that the reaction of the turbine wheel 14a becomes small and the supercharging pressure becomes low.

As described above, the higher the alcohol concentration A of a fuel and hence the higher the octane number, the supercharging pressure is set at a higher value without causing any knocking. On the other hand, the lower the alcohol concentration A of a fuel and hence the lower the octane number, the supercharging pressure is set at a lower value in order to avoid abnormal combustion such as knocking. In this manner, the optimum supercharging pressure is set in accordance with the alcohol concentration A of a fuel, thereby utilizing the potential of the engine in accordance with the alcohol concentration A.

The control unit 41 also controls the fuel injection amount and the ignition timing in accordance with the alcohol concentration A.

The present invention is not limited to the above embodiment. In this embodiment, the duty solenoid valve is used as a supercharging pressure control actuator. The embodiment is not limited to the duty solenoid valve, but other means having a similar function may also be used.

As the supercharger, a turbocharger and the like may be used.

As described above, the supercharging pressure can be set properly in accordance with the alcohol concentration of a fuel, thereby positively using the potential of an engine. Accordingly, there are presented advantageous effects such as considerably improving the output performance of an engine.

FIGS. 6 to 9 show a second embodiment in which fuel pumps as the auxiliary equipment are controlled in accordance with the alcohol concentration of the fuel.

Figure 7:
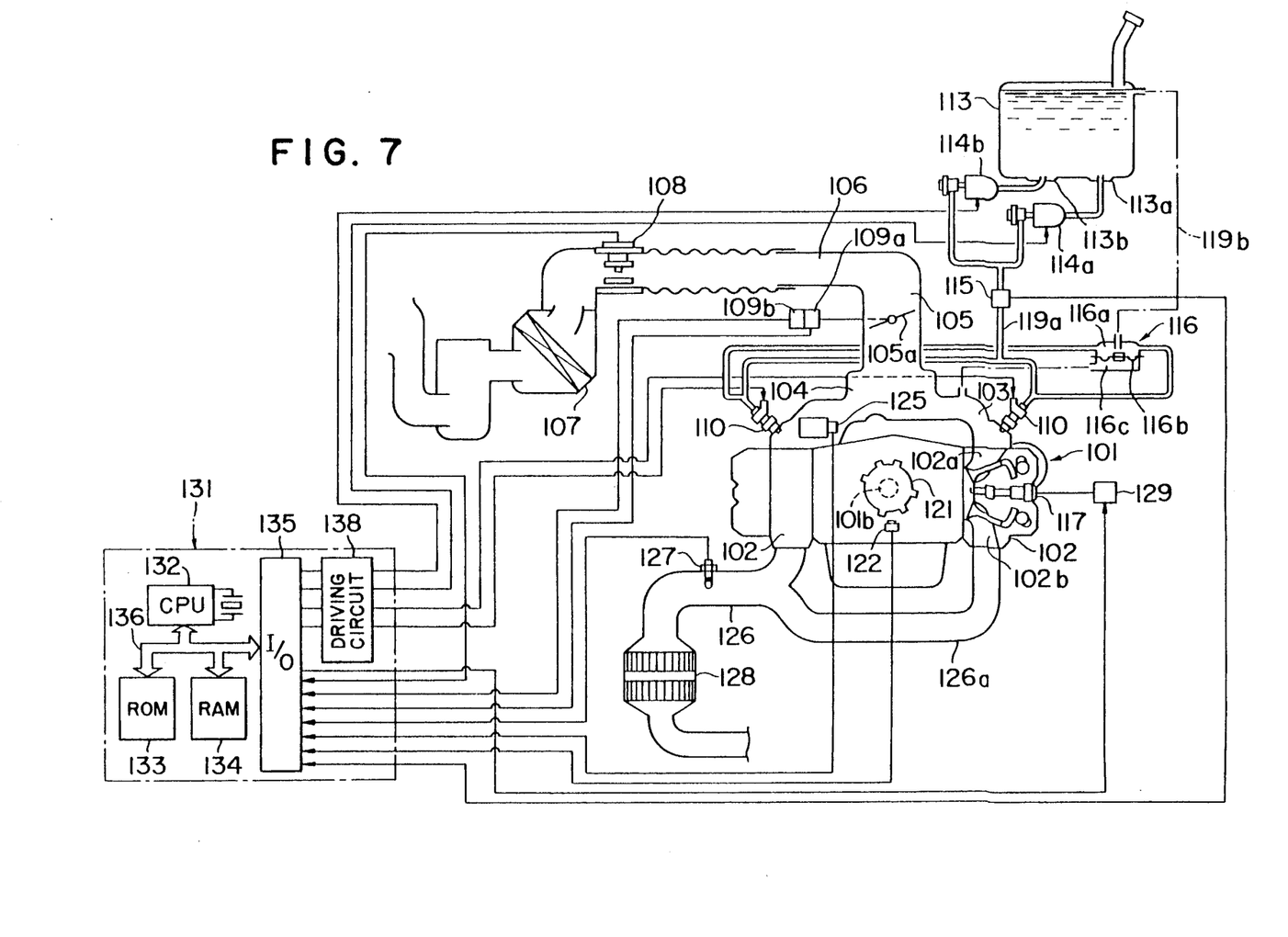
FIG. 7 is a schematic diagram of the engine control system.
Figure 8:
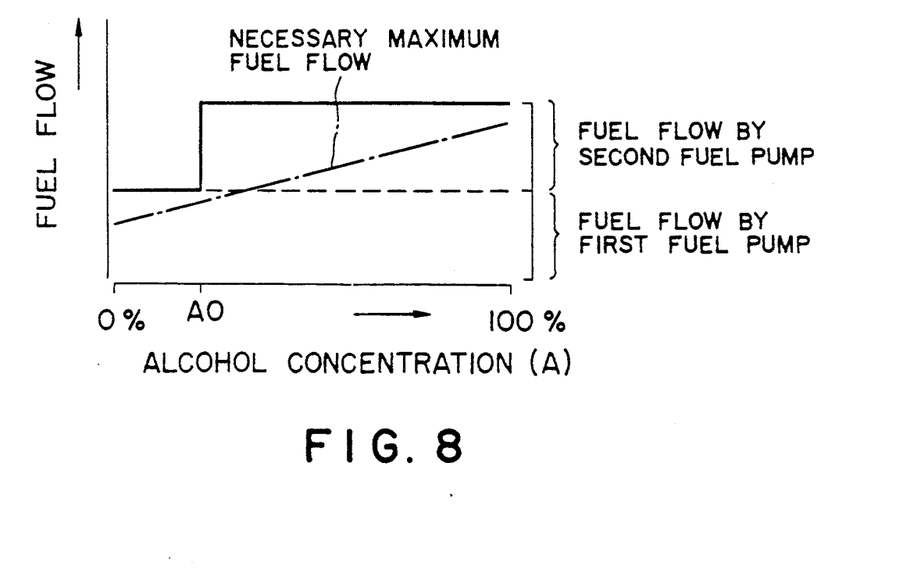
FIG. 8 is a graph showing a maximum necessary fuel flow rate and the fuel flow rate of a fuel pump with respect to the alcohol concentration.

Referring to FIG. 7, an air intake port 102a formed in a cylinder head 102 of an engine 101 communicates with an intake manifold 103. At the upstream end of the intake manifold 103, a throttle chamber 105 is formed in communication with the intake manifold 103 via an air chamber 104. At the upstream end of the throttle chamber 105, there is mounted an air cleaner 107 via an air intake pipe 106.

An intake air flow sensor (in FIG. 7 a hot wire type air flow meter) 108 is mounted at the downstream near the air cleaner 107 at the air intake pipe 106. At a throttle valve 105a mounted within the throttle chamber 105, there are mounted a throttle opening degree sensor 109a and an idling switch 109b for detecting the fullclose of the throttle valve 105a.

Injectors 110 are mounted upstream near the air intake port 102a of the intake manifold 103. Ignition plugs 117 for respective cylinders are mounted on the cylinder head 102, the tips of the plugs being exposed within respective combustion chambers.

A fuel tank 113 stores therein a fuel such as a fuel containing only alcohol, a fuel containing only gasoline, or a fuel containing both alcohol and gasoline, depending upon the circumstances when a user supplies the fuel.

Pools 113a and 113b formed at the bottom of the fuel tank 113 are coupled to first and second fuel pumps 114a and 114b having the same capacity and same revolution speed. Each of the pumps 114a and 114b includes a motor which is driven in response to a signal from a control unit to be described later.

The capacity of each of the first and second pumps 114a and 114b is the same as that of a fuel pump for an usual gasoline engine. Fuel passages extending out from the fuel pumps are connected together to form a fuel circuit 119a which communicates with each injector 110. An alcohol concentration sensor 115 is mounted downstream near the junction point of the fuel passages extending out from the fuel pumps.

An operation chamber 116a for a pressure regulator 116 is mounted at the fuel circuit 119a. A pressure regulator chamber 116c partitioned from the operation chamber 116a by a diaphragm 116b communicates with the intake manifold 103 as indicated by a dashed line in FIG. 7. One end of a fuel return passage 119b communicates with the operation chamber 116a of the pressure regulator 116, and the other end thereof communicates with the upper portion of the fuel tank 113. The pressure regulator 116 controls to maintain constant the difference between the fuel pressure of the injector 110 and the pressure of the intake manifold 103 so as not to change the fuel injection amount for the injector with a change in the pressure of the intake manifold 110.

A crank angle sensor 122 such as a magnetic pickup for detecting the crank angle and the engine speed is mounted opposing the outer periphery of a crank rotor 121 coupled to the crank shaft 101a of the engine 101.

A coolant temperature sensor 125 is mounted at a coolant passage (not shown) as a riser formed at the intake manifold 103.

An $O_2$ sensor 127 is mounted near on an exhaust pipes 126 connected to an exhaust manifold 126a communicating with each exhaust port 102b of the cylinder head 102. Reference numeral 128 represents a catalyst converter.

Circuit Arrangement of the Control Apparatus

Reference numeral 131 generally represents the control unit. In this control unit 131, interconnected together via a bus line 136f are a CPU (Central Processing Unit) 132, a ROM 133, a RAM 134 and an I/O interface 135. The above-described sensors 108, 109a, 115, 122, 125, 127, and idling switch 109b are connected to input ports of the I/O interface 135.

To output ports of the I/O interface 135, there are connected the ignition plug 117 via an igniter 129, the injector 110 and the motors of the fuel pumps 114a and 114b, respectively via a driver circuit 138.

The ROM 133 stores control programs, and fixed data. The RAM 134 stores processed output signals from the sensors, and data processed by the CPU 132.

In accordance with the control programs stored in the ROM 133 and various data stored in the RAM 134, the CPU 132 calculates fuel injection amount, ignition timing, pump driving conditions and the like corresponding to a particular alcohol concentration.

Function and Structure of Control Apparatus

Figure 6:
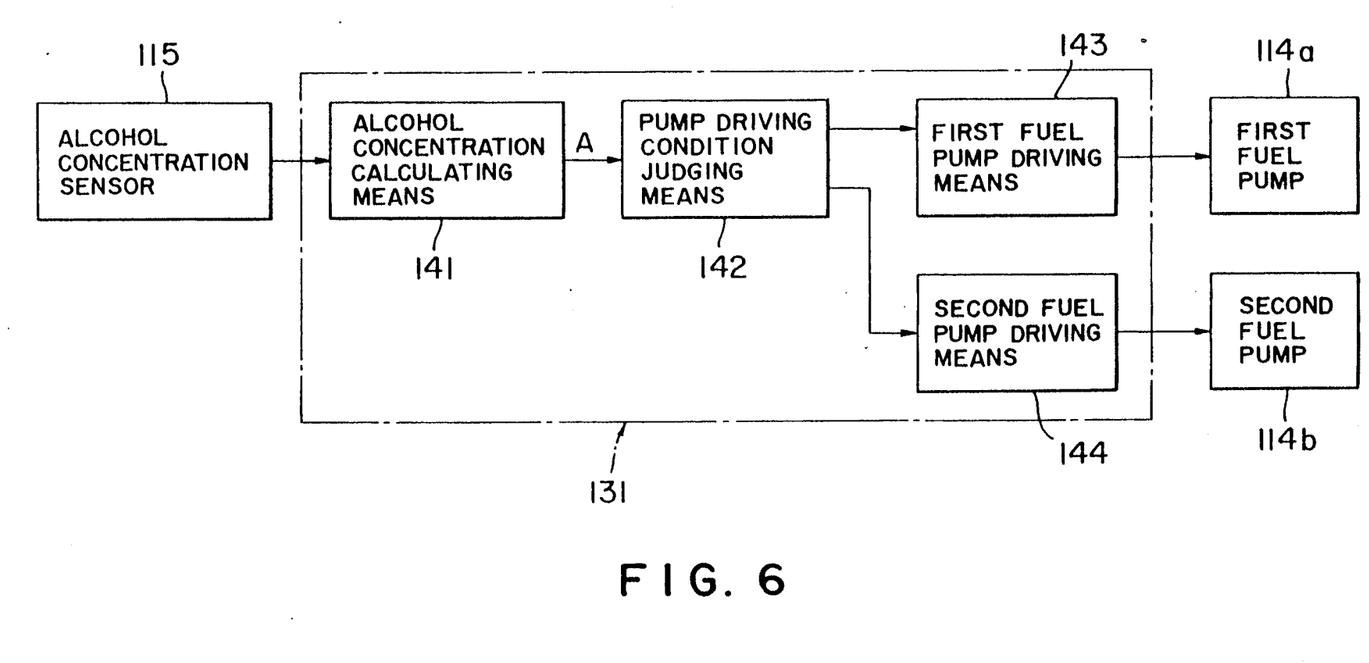
FIG. 6 is a functional block diagram of a fuel flow rate control of the present invention.

As shown in FIG. 6, the control function of the control unit 131 is constructed of alcohol concentration calculating means 141, pump driving condition judging means 142, first fuel pump driving means 143, and second fuel pump driving means 144.

The alcohol concentration calculating means 141 reads a signal output from the alcohol concentration sensor 115 to calculate an alcohol concentration A of a fuel The pump driving condition judging means 142 reads a reference alcohol concentration A0 previously stored in the ROM 133, and compares the reference alcohol concentration A0 with the alcohol concentration A (%) calculated by the alcohol concentration calculating means 141. If the alcohol concentration A is smaller than the reference alcohol concentration A0 (A<A0), first fuel pump driving means 143 outputs a drive signal to the first fuel pump 114a to drive it only. On the other hand, if the alcohol concentration A is equal to or larger than the reference alcohol concentration A0 (A≧A0), first fuel pump driving means 143 and second fuel pump driving means 144 output drive signals to the first fuel pump 114a and the second fuel pump 114b.

The reference alcohol concentration A0 is set at a value at which the fuel supply amount (fuel flow) of one fuel pump 114a is slightly larger than necessary maximum fuel flow (e.g., A0 = 10 to 30%).

As described previously, as the alcohol concentration A becomes higher, an air/fuel ratio lowers so that it becomes necessary to increase the fuel injection amount. Accordingly, as indicated by a dashed line in FIG. 8, the necessary maximum fuel flow depending on a maximum fuel injection amount becomes larger as the alcohol concentration A becomes higher.

Accordingly, if it is judged A<A0 indicating that the necessary maximum fuel flow is smaller than the fuel supply amount of one fuel pump 114a, only the first fuel pump 114a is driven. On the other hand, if it is judged A≧A0 indicating that the necessary maximum fuel flow is in excess of the fuel supply amount of one fuel pump 114a, both the first and second fuel pumps 114a and 114b are driven to obtain the necessary maximum fuel flow sufficiently. cControl Procedure The control procedure by the control unit 131 will be described next with reference to the flow chart shown in FIG. 9.

Figure 9:
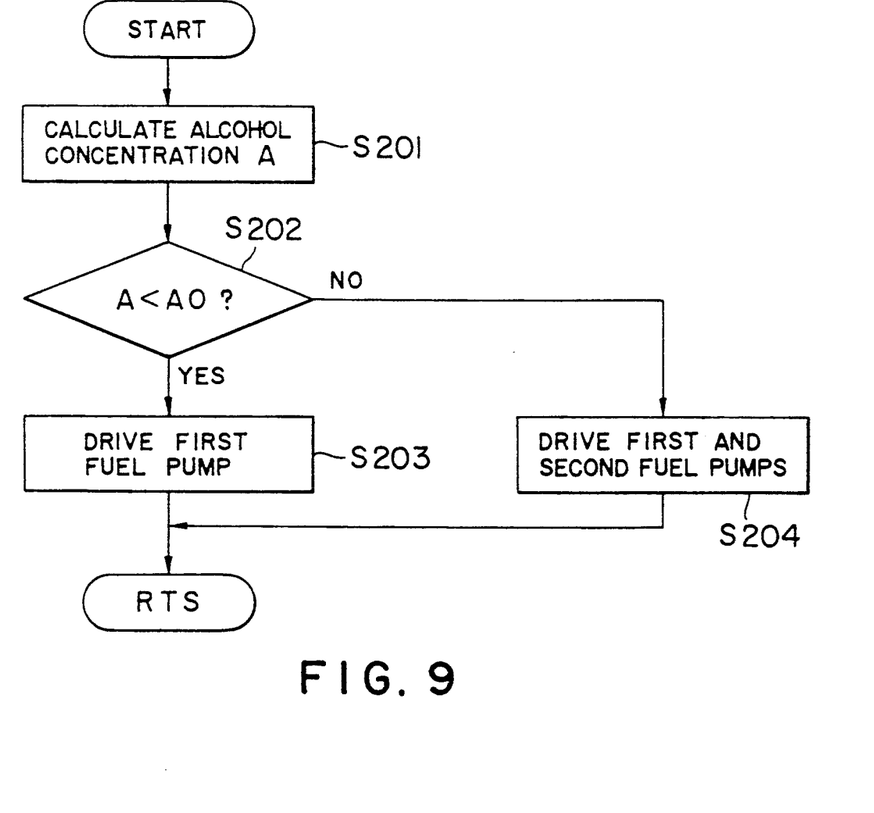
FIG. 9 is a flow chart showing a fuel flow rate control process.

The program as illustrated in FIG. 9 is an interrupt program which is executed at a predetermined time or at a predetermined cycle during the period from when the power of the control apparatus 131 is turned on to when it is turned off (from the engine start to the engine stop).

First, at a step S201, a signal from the alcohol concentration sensor 115 is read to calculate the alcohol concentration A of the fuel, and thereafter the control advances to a step S202.

At the step S202, the reference alcohol concentration A0 previously stored in the ROM 133 is read and compared with the alcohol concentration A calculated at the step S201. If the alcohol concentration A is smaller than the reference alcohol concentration A0 (A<A0), it is judged that the necessary maximum fuel flow is smaller than the fuel amount of one fuel pump 114a and the control advances to a step S203 whereat a drive signal is output to the first fuel pump 114a. Accordingly, only the first fuel pump 114a is driven and a smaller fuel amount is circulated. Driving only the first fuel pump 114a continues until the next fuel flow amount control program is executed or until the power of the control unit 131 is turned off.

On the other hand, if it is judged that $A \geq A0$ at the step S202 indicating that the necessary maximum fuel flow is in excess of the fuel flow of one fuel pump 114a, the control advances to a step S204 whereat drive signals are outputted to the first and second fuel pumps 114a and 114b. The fuel flow into the fuel passage 119a becomes twofold to ensure the necessary maximum fuel flow sufficiently. Driving both the first and second fuel pumps 114a and 114b continues until the next fuel flow amount control program is executed or until the power of the control apparatus 131 is turned off.

If the program is executed for the first time, only the first fuel pump 114a is driven.

As described above, only the first fuel pump 114a or both the first and second fuel pumps 114a and 114b are selectively driven in accordance with the alcohol concentration A, thereby stepwise increasing the fuel flow. Accordingly, an excessive supply of a fuel at a relatively low alcohol concentration region and an insufficient supply at a relatively high alcohol concentration region can be avoided, ensuring an efficient fuel supply over the full operation range of the engine, avoiding energy loss, and making less noise.

Since two fuel pumps 114a and 114b are used, each fuel pump may be made compact and the mounting thereof is made easy.

The present invention is not limited to the above embodiment. For example, three or more fuel pumps may be disposed in parallel and stepwise driven in accordance with the alcohol concentration so that the fuel flow suitable for a particular necessary maximum fuel flow can be set more finely.

Although the present invention has been fully described by way of the preferred embodiments thereof with reference to the accompanying drawings, various changes and modifications will be made in this technical field. Therefore, unless otherwise these changes and modifications depart from the scope of the present invention, they should be construed as being included therein.

We claim:

1. A control apparatus for an engine of a vehicle, said engine using a fuel containing alcohol and having supercharging means for supercharging intake air to the engine and actuating means for controlling a supercharging pressure supercharged by said supercharging means, comprising:
   an alcohol concentration sensor for outputting a detection signal corresponding to an alcohol concentration of the fuel;
   alcohol concentration calculating means responsive to said detection signal for calculating said alcohol concentration;
   optimum supercharging pressure setting means for setting an optimum supercharging pressure with respect to said alcohol concentration; and
   driving means responsive to data of said optimum supercharging pressure for driving said actuating means so as to control said supercharging pressure for the engine to said optimum supercharging pressure, thereby operating the engine efficiently in any alcohol concentration of the fuel.

2. The control apparatus according to claim 1, wherein said supercharging means is a turbocharger with a waste gate valve for supercharging the intake air into the engine and said actuating means is adapted to operate said waste gate valve to control the supercharging pressure.

3. The control apparatus according to claim 2, wherein said turbocharger comprises a turbine communicating with an exhaust pipe of the engine to be rotated by exhaust gas passing therethrough and a compressor coupled to said turbine and communicating with an intake pipe of the engine to compress intake air, and said waste gate valve is adapted to change the exhaust gas flow rate at said turbine to control the supercharging pressure.

4. The control apparatus according to claim 1, wherein said optimum supercharging pressure setting means is adapted to increase said optimum supercharging pressure with increasing alcohol concentration.

5. The control apparatus according to claim 4, wherein said optimum supercharging pressure setting means includes an optimum supercharging pressure map which stores a plurality of values of said optimum supercharging pressure with respect to said alcohol concentration.

* * * * *